UNITED STATES PATENT OFFICE

WALTER S. BAYLIS, OF LOS ANGELES, CALIFORNIA, ASSIGNOR, BY MESNE ASSIGNMENTS, TO FILTROL COMPANY OF CALIFORNIA, OF LOS ANGELES, CALIFORNIA, A CORPORATION OF CALIFORNIA

RE-ACTIVATED ADSORBENT AND METHOD OF MAKING SAME

No Drawing.      Application filed April 10, 1928. Serial No. 269,031.

This invention relates to a method of reactivating adsorbent clays which have been used in decolorizing oils, either organic or mineral, but particularly the latter.

An object of the invention, therefore, is to provide a reactivated adsorbent clay capable of decolorizing mineral oils efficiently.

In the preferred practice of my invention, finely spent acid treated adsorbent clay of the bentonite type (including the montmorillonite type) of which filtrol is a good example, is first freed from excess oil by pressing, centrifuging or extracting with suitable solvents. This step may be dispensed with, if desired. The spent clay is then heated, by ignition or otherwise, in a reactivating furnace, preferably one of the Herreshoff type, to a low red heat. Air is freely admitted to the furnace or kiln and constant stirring is preferably practiced. The object of the heating is to burn out the carbonaceous matter from the pores of the clay while keeping the temperature low enough to prevent any sintering or destruction of the porous structure of the clay.

I have found that five hours of this heat treatment is usually sufficient to place the clay in condition for my further operations. It will be understood that the above treatment may be lengthened or shortened, depending on the conditions. Some clays may hold the adsorbed matter more deeply in the pores than others, and some adsorbed matters, especially those of a bituminous nature, are less easily oxidized than others.

After this operation is finished, the clay is in the form of a finely divided powder. I then mud the clay by mixing it with water or a mixture of water and acid. This operation is preferably carried out in a tank made especially for the purpose and provided with an agitator. It may, however, be done in the oxidizing furnace by spraying the hot charge with water or acidified water while agitating. More water would have to be used in such case, on account of the loss by volatilization. The acid may be added last, and in such case.

The quantity of combined water and acid used should be such that the mixture with the clay shall be a fairly stiff mud. The amount of water used need not be extremely accurately measured, but can range from 5% to 400% of the clay by weight. The amount of acid should be from 1% to 4% (preferably 2%) of 66° Baumé sulphuric acid, calculated on the bone-dry weight of the clay as it leaves the furnace.

The water may be added to the clay first and then the acid, or a mixture of acid and water may be used to make the mud. I prefer to add the water first and acid afterward. The acid may be added first if good agitating equipment is at hand to thoroughly distribute the acid in the clay before the water is added.

During the incorporation of the acid or acid and water, the clay is preferably warmed to a temperature not exceeding 100° C. and preferably just below it.

Since the soluble reaction products have already been washed out of the kind of clays that I revivify, at the time of their original activation, I do not find it necessary to wash them again. I use the mudded adsorbent directly on the oil by the "contact process". The mud is thrown into a tank containing the heated oil intended to be decolorized. Said oil is strongly agitated while hot, in such a manner that the mud is broken up into very fine particles. These exert a very powerful adsorbing action, effectively withdrawing the coloring matter from the oil.

My process is adaptable to revivify the type of clay that I have specified, any number of times. The following claims are to be interpreted to cover not only the first revivification, but any subsequent one.

The revivified material itself is unique in that it has substantially the same decolorizing power as the original material.

I claim as my invention:

1. In the process of revivifying adsorbent clay of the bentonite type which has been treated with acid and subsequently washed and which has been used in the decolorizing of oils, the steps which comprise roasting the clay with access of air and with stirring until the carbonaceous matter is substantially eliminated, but the clay preserved unsintered, then making the clay into a mud containing water and 1% to 4% of the dry weight of the clay as sulphuric acid.

2. A process according to claim 1 in which the clay is warmed to nearly 100° C. while being mudded.

3. A process according to claim 1 in which the concentrated acid is first added to the clay with strong agitation and then enough water added to make a mud of the clay.

4. A revivified adsorbent clay which has previously been acid activated and washed, substantially free from carbonaceous material, and in the form of a mud containing sulphuric acid in the proportion of 1% to 4% of dry clay.

In testimony whereof, I have hereunto set my hand at New York, New York, this 2d day of April, 1928.

WALTER S. BAYLIS.